United States Patent
Bakker

(10) Patent No.: US 8,884,892 B2
(45) Date of Patent: Nov. 11, 2014

(54) PORTABLE ELECTRONIC DEVICE AND METHOD OF CONTROLLING SAME

(75) Inventor: Jan Hendrik Lucas Bakker, Keller, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 451 days.

(21) Appl. No.: 13/209,254

(22) Filed: Aug. 12, 2011

(65) Prior Publication Data
US 2013/0038541 A1     Feb. 14, 2013

(51) Int. Cl.
*G06F 3/041*     (2006.01)
*G09G 5/00*     (2006.01)
*G06F 3/033*     (2013.01)
*G06F 3/0482*     (2013.01)
*G06F 3/0488*     (2013.01)

(52) U.S. Cl.
CPC .......... *G06F 3/0482* (2013.01); *G06F 3/04886* (2013.01); *G06F 3/04883* (2013.01)
USPC .............................. 345/173; 715/863; 345/1.1

(58) Field of Classification Search
USPC ......................................................... 345/173
See application file for complete search history.

(56) References Cited

U.S. PATENT DOCUMENTS

| | | | |
|---|---|---|---|
| 7,656,393 B2 | 2/2010 | King et al. | |
| 2002/0067318 A1* | 6/2002 | Matsuzaki et al. | 345/1.1 |
| 2008/0238884 A1 | 10/2008 | Harish | |
| 2008/0273014 A1 | 11/2008 | Lowles et al. | |
| 2009/0119616 A1 | 5/2009 | Chalemin et al. | |
| 2009/0278805 A1 | 11/2009 | Kao et al. | |
| 2010/0007613 A1* | 1/2010 | Costa | 345/173 |
| 2010/0100067 A1 | 4/2010 | Pugliese, III | |
| 2010/0105443 A1 | 4/2010 | Vaisanen | |
| 2010/0107067 A1 | 4/2010 | Vaisanen | |
| 2010/0175018 A1 | 7/2010 | Petschnigg et al. | |
| 2010/0185989 A1 | 7/2010 | Shiplacoff et al. | |
| 2011/0209097 A1 | 8/2011 | Hinckley et al. | |
| 2011/0209099 A1* | 8/2011 | Hinckley et al. | 715/863 |

FOREIGN PATENT DOCUMENTS

| | | |
|---|---|---|
| CN | 102122229 | 7/2011 |
| EP | 2003539 | 12/2008 |
| EP | 2211256 | 7/2010 |
| WO | 0068766 | 11/2000 |
| WO | WO 2009/088672 | 7/2009 |

OTHER PUBLICATIONS

ETSI TI 127 007 U10.4.0 (Jun. 2011) "Digital Cellular Telecommunications System (Phase 2+); Universal Mobile Telecommunications System (UMTS); LTE; AT Command Set for User Equipment (UE) (3GPP TS 27.007 Version 10.4.0 Release (10)," Technical Specification, European Telecommunications Standards Institute (ETSI), Jun. 2006.

International Search Report and Written Opinion mailed May 4, 2012, for International Application No. PCT/US2011/047677.

(Continued)

*Primary Examiner* — Charles V Hicks

(74) *Attorney, Agent, or Firm* — Finnegan, Henderson, Farabow, Garrett & Dunner, LLP

(57) ABSTRACT

A method for a User Equipment (UE), includes responsive, at least in part, to an ATtention (AT) command for touch-sensitive display action, emulating or reporting a meta-navigation gesture for a touch-sensitive input including a display area and a non-display area.

23 Claims, 6 Drawing Sheets

(56) References Cited

OTHER PUBLICATIONS

Bragdon, A., et al., "Experimental Analysis of Touch-Screen Gesture Designs in Mobile Environments," *CHI 2011*, May 7-12, 2011, pp. 1-10.

Roth, V., et al., "Bezel Swipe: Conflict-Free Scrolling and Multiple Selection on Mobile Touch Screen Devices," *CHI 2009*, Apr. 4-9, 2009, pp. 1-4.

3GPP TS 27.007 3rd Generation Partnership Project; Technical Specification Group Core Network and Terminals; AT Command Set for User Equipment (UE) (Release 10) v10.4.0, Jun. 2011, 9 pages.

Office Action from the Korean Patent Office for corresponding Korean Patent No. 10-2013-7005458, dated Feb. 12, 2014, 5 pages. (English Translation not available).

Office Action from Japanese Patent Office for corresponding Japanese Application No. 2013-530153, 3 pages. (English Translation not available).

* cited by examiner

PORTABLE ELECTRONIC DEVICE AND METHOD OF CONTROLLING SAME

FIELD OF TECHNOLOGY

The present disclosure relates to electronic devices including, but not limited to, portable electronic devices having touch-sensitive displays.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive display may be modified depending on the functions and operations being performed.

Improvements in electronic devices with touch-sensitive displays are desirable.

BRIEF DESCRIPTION OF THE DRAWINGS

Embodiments of the present disclosure will now be described, by way of example only, with reference to the attached Figures, wherein.

DETAILED DESCRIPTION

Figure 1:
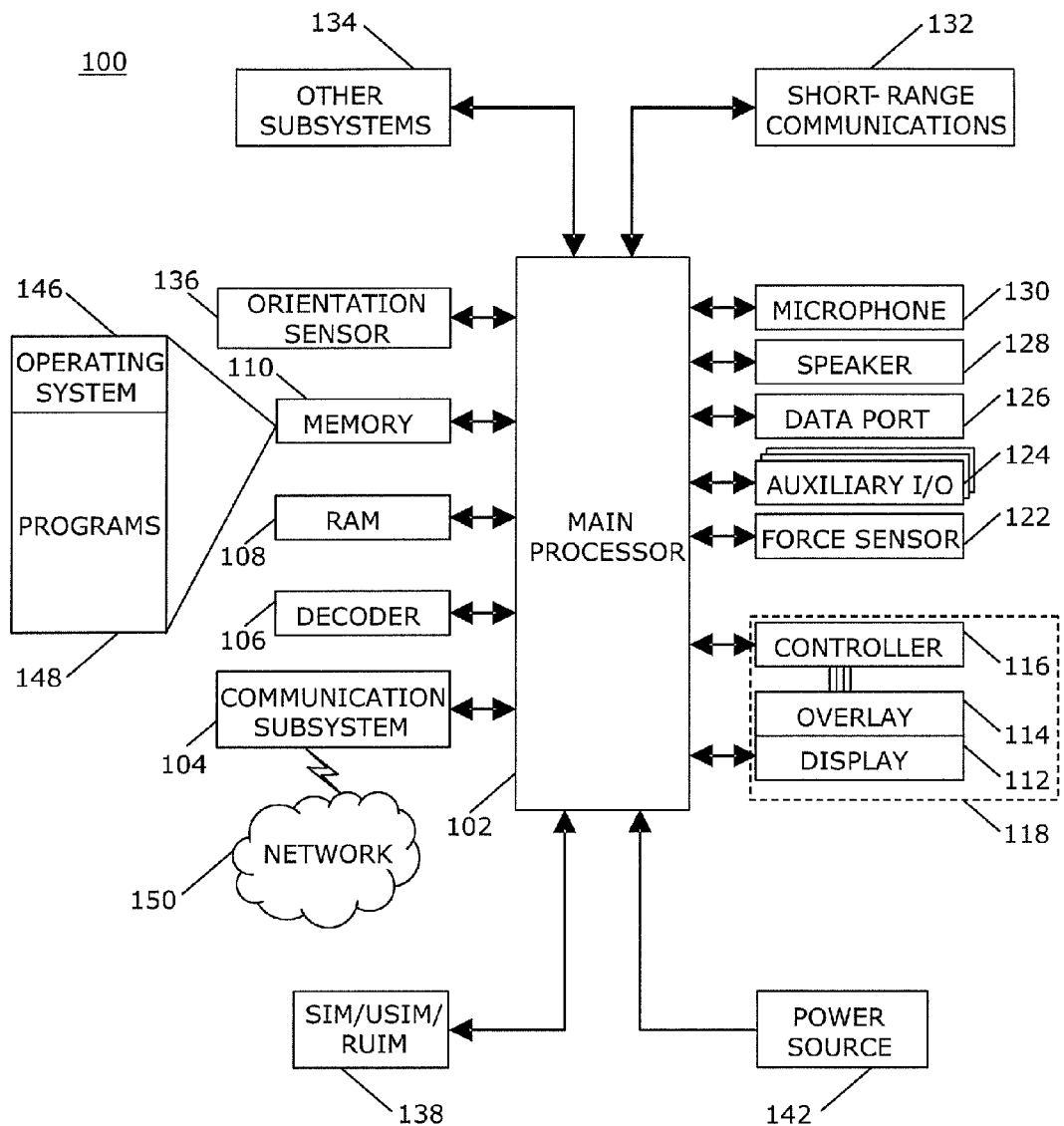
FIG. 1 is a block diagram of a portable electronic device in accordance with an example embodiment.

The following describes a User Equipment (UE) and a method that includes responsive, at least in part, to an ATtention (AT) command for touch-sensitive display action, emulating a meta-navigation gesture for a touch-sensitive input device comprising a display area and a non-display area.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, such as a portable electronic device. Examples of portable electronic devices include wireless communication devices such as pagers, mobile or cellular phones, smartphones, wireless organizers, PDAs, notebook computers, netbook computers, tablet computers, and so forth. The portable electronic device may also be a portable electronic device without wireless communication capabilities. Examples include handheld electronic game device, digital photograph album, digital camera, notebook computers, netbook computers, tablet computers, or other device.

A block diagram of an example of a portable electronic device 100 is shown in FIG. 1. The portable electronic device 100 includes multiple components, such as a processor 102 that controls the overall operation of the portable electronic device 100. The portable electronic device 100 presently described optionally includes a communication subsystem 104 and a short-range communications 132 module to perform various communication functions, including data and voice communications. In the present example, short-range communication is included. Any suitable type of wireless communication may be utilized instead or in addition to the short-range communication. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive input device for touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an orientation sensor 136 such as an accelerometer to detect direction of gravitational forces or gravity-induced reaction forces so as to determine, for example, the orientation of the portable electronic device 100.

To identify a subscriber for network access, the portable electronic device 100 may utilize a UICC (Universal Integrated Circuit Card). The UICC is a smart card utilized in User Equipment (UE) such as the portable electronic device 100 in GSM (Global System for Mobile Communications) and UMTS (Universal Mobile Telecommunications System) networks. The UICC is utilized to ensure the integrity and security of personal data. For example, in a GSM network, the UICC contains a SIM (Subscriber Identity Module) application. In a UMTS network the UICC utilizes the USIM (Universal Subscriber Identity Module) application. In a CDMA (Code Division Multiple Access) network, the UE may include a Removable User Identity Module(RUIM). The portable electronic device 100 may use the SIM/USIM/RUIM 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104, for example.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example embodiment, the touch-sensitive display 118 is a capacitive touch-sensitive display which includes a capacitive touch-sensitive overlay 114. The overlay 114 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 112 of the touch-sensitive display 118 includes a display area 206 in which information may be displayed, and a non-display area 208 extending around the periphery of the display area 206. Information is not displayed in the non-display area 208, which is utilized to accommodate, for example, electronic traces or electrical connections, adhesives or other sealants, and/or protective coatings around the edges of the display area 206.

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact, known as the centroid. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. The location of the touch moves as the detected object moves during a touch. The controller 116 and/or the processor 102 may detect a touch by any suitable contact member on the touch-sensitive display 118. Similarly, multiple simultaneous touches, are detected. When multiple simultaneous touches are emulated or indicated in between components within a device, for example, via an Application Programming Interface (API), a unique identifier may be associated with a simultaneous touch. For example, the unique identifier may be a non-zero integer value N, representing the Nth simultaneous touch action performed on the touch-sensitive display 118. A touch may include multiple events. For example, a touch may include a first event indicating that the screen, which may be the display area 206 or the non-display area 208, is pressed (a touch is detected) at a first coordinate location on the touch-sensitive display 118, and a second event indicating that the pressing of the screen is stopped (i.e. released) (the touch is stopped or discontinued) at a second coordinate location on the touch-sensitive display 118. The second coordinate location of the touch when discontinued may differ from the first coordinate location of the touch when the touch is initially detected. If the first and second events represent a simultaneous touch or multi-touch gesture, the events may be correlated or the touches may be identified by the same unique identifier.

One or more gestures are also detected on the touch-sensitive display 118. A gesture is a particular type of touch on a touch-sensitive display 118 that begins at an origin point and continues to an end point. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. In some implementations a coordinate system, utilized to identify locations or points on a touch-sensitive display 118, may be fixed, i.e., the origin coordinate (0,0) of the coordinate system does not change depending on the orientation of the portable electronic device 100.

An example of a gesture is a swipe (also known as a flick). A swipe has a single direction. The touch-sensitive overlay 114 may evaluate swipes with respect to the origin point at which contact is initially made with the touch-sensitive overlay 114 and the end point at which contact with the touch-sensitive overlay 114 ends rather than using each of location or point of contact over the duration of the gesture to resolve a direction.

Examples of swipes include a horizontal swipe, a vertical swipe, and a diagonal swipe. A horizontal swipe typically comprises an origin point towards the left or right side of the touch-sensitive overlay 114 to initialize the gesture, a horizontal movement of the detected object from the origin point to an end point towards the right or left side of the touch-sensitive overlay 114 while maintaining continuous contact with the touch-sensitive overlay 114, and a breaking of contact with the touch-sensitive overlay 114. Similarly, a vertical swipe typically comprises an origin point towards the top or bottom of the touch-sensitive overlay 114 to initialize the gesture, a vertical movement of the detected object from the origin point to an end point towards the bottom or top of the touch-sensitive overlay 114 while maintaining continuous contact with the touch-sensitive overlay 114, and a breaking of contact with the touch-sensitive overlay 114.

The terms top, bottom, right, and left are utilized herein for the purpose of providing a reference and refer to an edge or side of the touch-sensitive display 118 of the portable electronic device 100 relative to the orientation in which the information associated with the application is displayed.

As described above, an orientation sensor 136, such as an accelerometer, may be utilized to detect the direction of gravitational forces or gravity-induced reaction forces to determine, for example, the orientation of the portable electronic device 100 and to detect changes from one orientation to another. Alternatively, other means to detect the orientation and orientation change may be utilized. Four orientations may be utilized, for example. The orientation of the portable electronic device 100 may be utilized by an application or application function or program to determine, for example, whether a swipe is a horizontal swipe or a vertical swipe, and which sides of the touch-sensitive display 118 are the top, the bottom, the left side, and the right side. The orientation of the portable electronic device 100 may be determined based on output from the orientation sensor 136 and the orientation may be identified, for example, by identifying a feature of the touch-sensitive display 118 as a reference. For example, coordinate values of a corner of the non-display area 208 may be identified as the upper-left corner. Alternatively, one side of the touch-sensitive display 118 may be identified as the top. The side may be identified, for example, by identifying coordinate values of the upper-left corner and coordinate values of the upper-right corner. Other corners or sides may alternatively be identified. By identifying a corner or one side, the direction and the orientation of the swipe may be determined relative to the orientation of the portable electronic device 100 and relative to the orientation in which the information associated with the application is displayed.

Alternatively, sides of the touch-sensitive display 118 may have a "normal" orientation such that the four sides are labeled with static labels. The static labels may include, for example, "top", "bottom", "right side", and "left side", and these labels may correspond to locations of the sides in a normal or upright orientation in which the portable electronic device 100 is positioned or held. Thus, when queried, the orientation may be such that the side labeled "right" is on the left side or the side labeled "top" is on the bottom. The orientation may be determined utilizing a single value representing, for example, an angle in degrees from the "normal" orientation. An orientation of 180 degrees may indicate that the current orientation of the portable electronic device 100 is such that the side with physical coordinates (x, y) at the left is the side at the top in the orientation in which the portable electronic device 100 is positioned or held. Alternatively, two values may be utilized to identify orientation. The two values may represent angles, relative to the origin coordinates. Each value corresponds to an angle in a different direction to facilitate representation of the orientation of the device in three dimensions. Utilizing two values, an angle in degrees relative to the normal orientation and a tilt of the portable electronic device 100 may be indicated.

Swipes may be of various lengths, may be initiated in various places on the touch-sensitive overlay 114, and need not span the full dimension of the touch-sensitive overlay 114. In addition, breaking contact of a swipe may be gradual in that contact with the touch-sensitive overlay 114 is gradually reduced while the swipe is still underway.

Meta-navigation gestures may also be detected by the touch-sensitive overlay 114. A meta-navigation gesture is a gesture that has an origin point that is outside the display area 206 of the touch-sensitive overlay 114 and that moves to a position on the display area 206 of the touch-sensitive display 118. Other attributes of the gesture may be detected and be utilized to detect the meta-navigation gesture. Meta-navigation gestures may also include multi-touch gestures in which gestures are simultaneous or overlap in time and at least one of the touches has an origin point that is outside the display area 206 and moves to a position on the display area 206 of the touch-sensitive overlay 114. Thus, two fingers may be utilized for meta-navigation gestures. Further, multi-touch meta-navigation gestures may be distinguished from single touch meta-navigation gestures and may provide additional or further functionality.

In some example embodiments, an optional force sensor 122 or force sensors is disposed in any suitable location, for example, between the touch-sensitive display 118 and a back of the portable electronic device 100 to detect a force imparted by a touch on the touch-sensitive display 118. The force sensor 122 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, for example, "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
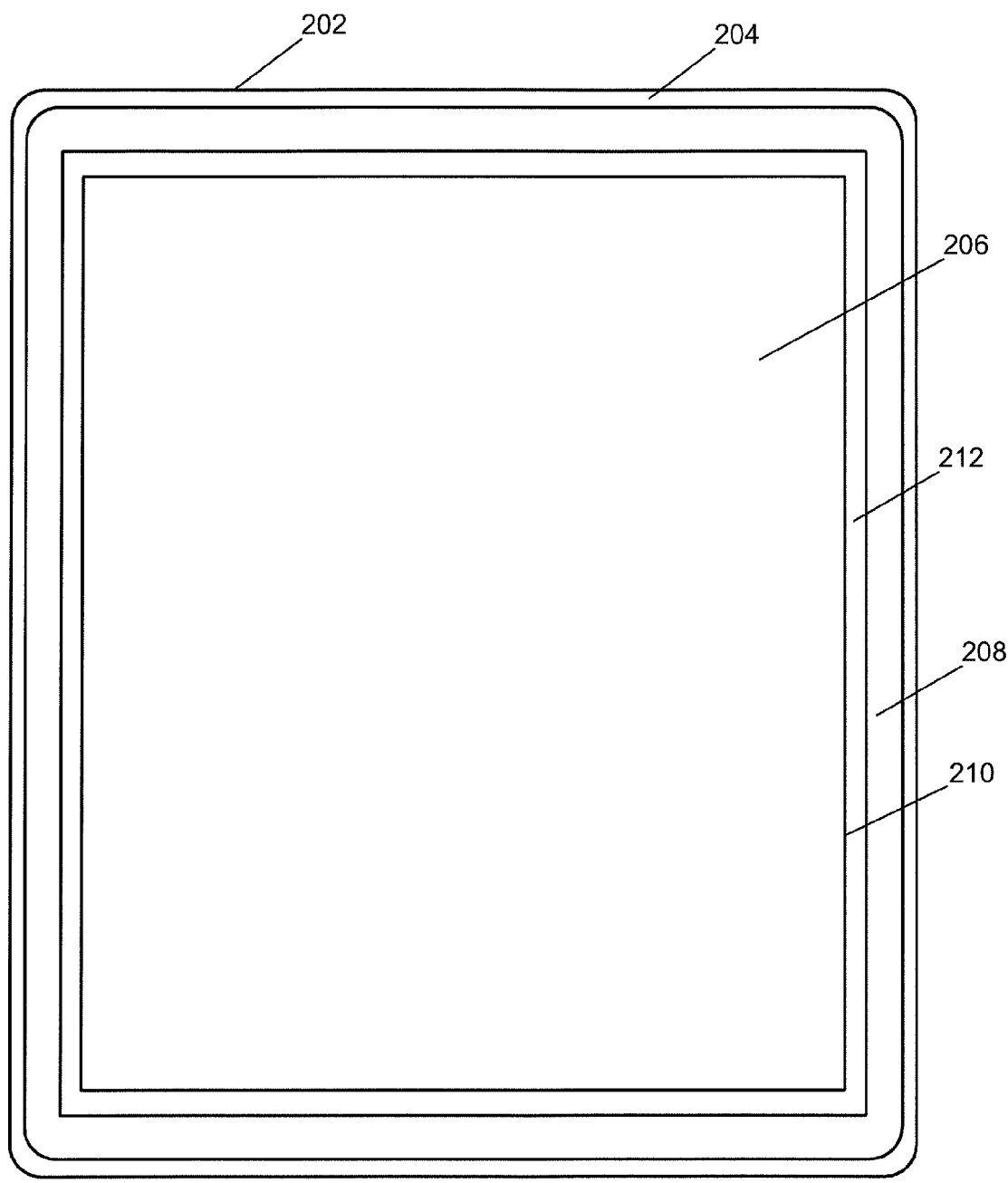
FIG. 2 is a front view of an example of a portable electronic device.

A front view of an example of the portable electronic device 100 is shown in FIG. 2. The portable electronic device 100 includes a housing 202 that encloses components such as shown in FIG. 1. The housing 202 may include a back, sidewalls, and a front 204 that frames the touch-sensitive display 118.

In the shown example of FIG. 2, the touch-sensitive display 118 is generally centered in the housing 202 such that a display area 206 of the touch-sensitive overlay 114 is generally centered with respect to the front 204 of the housing 202. The non-display area 208 of the touch-sensitive overlay 114 extends around the display area 206. In the presently described example embodiment, the width of the non-display area 208 is 4 mm.

For the purpose of the present example, the touch-sensitive overlay 114 extends to cover the display area 206 and the non-display area 208. Touches on the display area 206 may be detected and, for example, may be associated with displayed selectable features. Touches on the non-display area 208 may be detected, for example, to detect a meta-navigation gesture. Alternatively, meta-navigation gestures may be determined by both the non-display area 208 and the display area 206. The density of touch sensors may differ from the display area 206 to the non-display area 208. For example, the density of nodes in a mutual capacitive touch-sensitive display, or density of locations at which electrodes of one layer cross over electrodes of another layer, may differ between the display area 206 and the non-display area 208.

Gestures received on the touch-sensitive display 118 may be analyzed based on the attributes to discriminate between meta-navigation gestures and other touches, or non-meta navigation gestures. Meta-navigation gestures may be identified when the gesture crosses over a boundary near a periphery of the display 112, such as a boundary 210 between the display area 206 and the non-display area 208. In the example of FIG. 2, the origin point of a meta-navigation gesture may be determined utilizing the area of the touch-sensitive overlay 114 that covers the non-display area 208.

A touch, such as a gesture, may include multiple events. These events may be reported (for example between components of the portable electronic device 100 or UE). Meta-navigation gestures may be detected, for example, by determining that a gesture has an origin point that is outside the display area 206, or a boundary between the display area 206 and the non-display area 208, and an end point that is inside the boundary. The boundary may be determined by obtaining the coordinate size of the touch-sensitive overlay 114 and the size and coordinate location of the display area 206. The coordinate size of the touch-sensitive overlay 114 may be obtained, for example, beginning at (0,0) coordinate values and utilizing a maximum x coordinate value and a maximum y coordinate value. The display area 206 boundary may be determined, for example, utilizing, the x and y coordinate values for the top left corner of the display area 206 and the x and y coordinate values for the bottom right corner of the display area 206.

The determination of the location of the boundary may be carried out such that meta-navigation gestures may be determined for an application. Meta-navigation gestures may be determined and utilized, by electronic devices of different sizes, including different sized non-display areas and/or different sized display areas. Thus, the same application or program may run on electronic devices that have different sizes of display areas and/or different sizes of non-display areas.

A buffer region 212 or band that extends around the boundary 210 between the display area 206 and the non-display area 208 may be utilized such that a meta-navigation gesture is identified when a touch has an origin point outside the boundary 210 and the buffer region 212 and crosses through the buffer region 212 and over the boundary 210 to a point inside the boundary 210. Although illustrated in FIG. 2, the buffer region 212 may not be visible. Instead, the buffer region 212 may be a region around the boundary 210 that extends a width that is equivalent to a predetermined number of pixels, for example. Alternatively, the boundary 210 may extend a predetermined number of touch sensors or may extend a predetermined distance from the display area 206. The boundary 210 may be a touch-sensitive region or may be a region in which touches are not detected. The boundary may be determined, as described above, by obtaining the coordinate size of the touch-sensitive overlay 114 and the size and coordinate location of the display area 206. A width of the buffer region may also be utilized to detect meta-navigation gestures.

Gestures that originate in the buffer region 212, for example, may be identified as non-meta navigation gestures. Optionally, data from such gestures may be utilized by an application as a non-meta navigation gesture. Alternatively, data from such gestures may be discarded such that touches that have an origin point on the buffer region 212 are not utilized as input at the portable electronic device 100.

Figure 3:
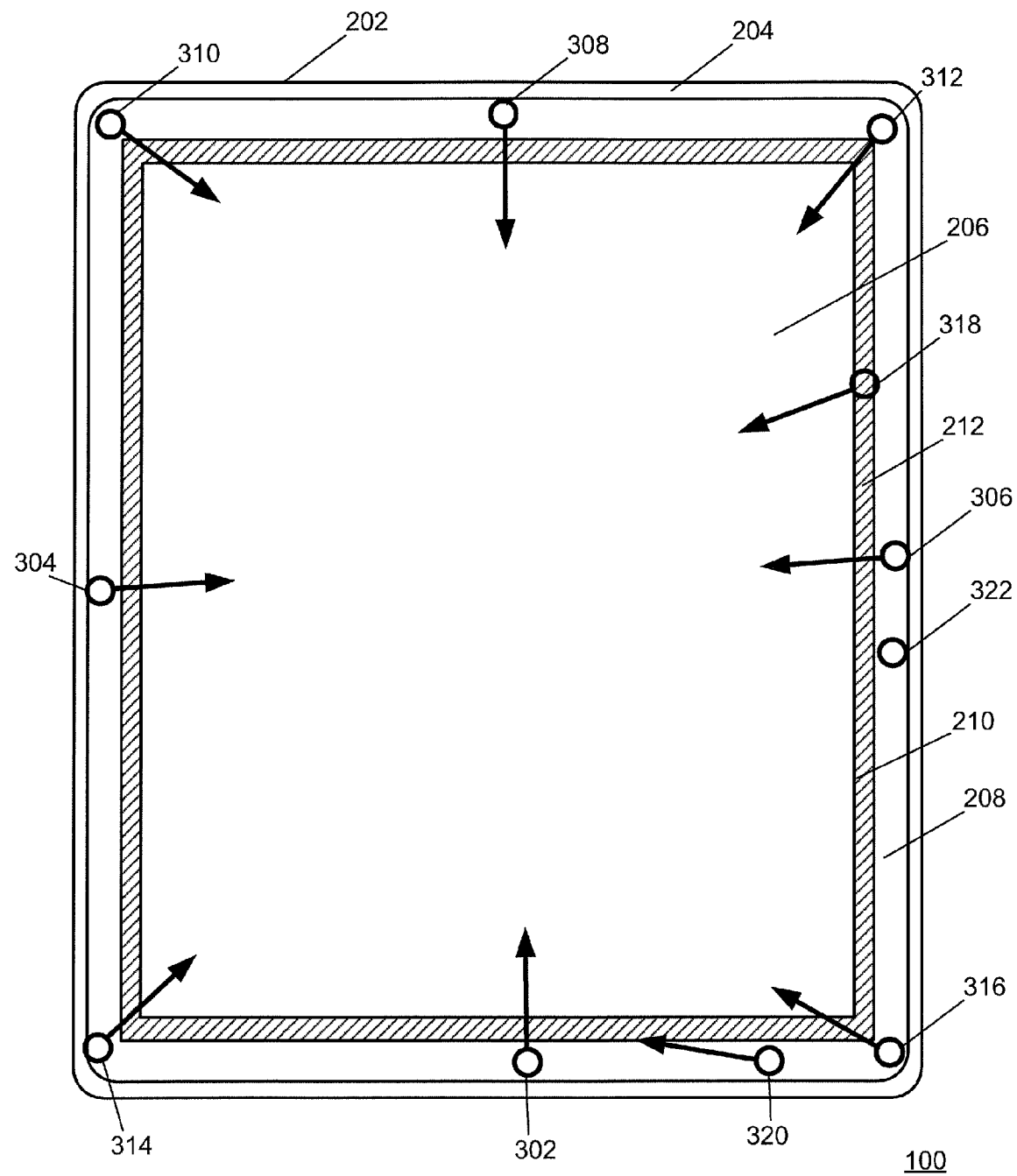
FIG. 3 illustrates examples of touches on the portable electronic device of FIG. 2.

FIG. 3 illustrates examples of touches on the touch-sensitive display 118. The buffer region 212 is illustrated in FIG. 3 by hash markings for the purpose of explanation. As indicated, the buffer region 212 may not be visible to the user. For the purpose of explanation, touches are illustrated by circles at their points of origin. Arrows extending from the circles illustrate the paths of the touches that are gestures.

The touch 302 begins at the origin point outside the boundary 210 and outside the buffer region 212. The path of the touch 302 crosses the buffer region 212 and the boundary 210 and is therefore identified as a meta-navigation gesture. Similarly, the touches 304, 306, 308, 310, 312, 314, 316 each have origin points outside the boundary 210 and the buffer region 212 and their paths cross the buffer region 212 and the boundary 210. Each of the touches 304, 306, 308, 310, 312, 314, 316 is therefore identified as a meta-navigation gesture. The touch 318, however, has an origin point that falls within the buffer region 212 and the touch 318 is therefore not identified as a meta-navigation gesture. The touch 320 begins at an origin point outside the boundary 210 and the buffer region 212. The path of the touch 320, however, does not cross the boundary 210 and is therefore not identified as a meta-navigation gesture. The touch 322 also has an origin point outside the boundary 210 and the buffer region 212 but is not a gesture and therefore does not cross the boundary 210 and is not identified as a meta-navigation gesture.

Figure 4:
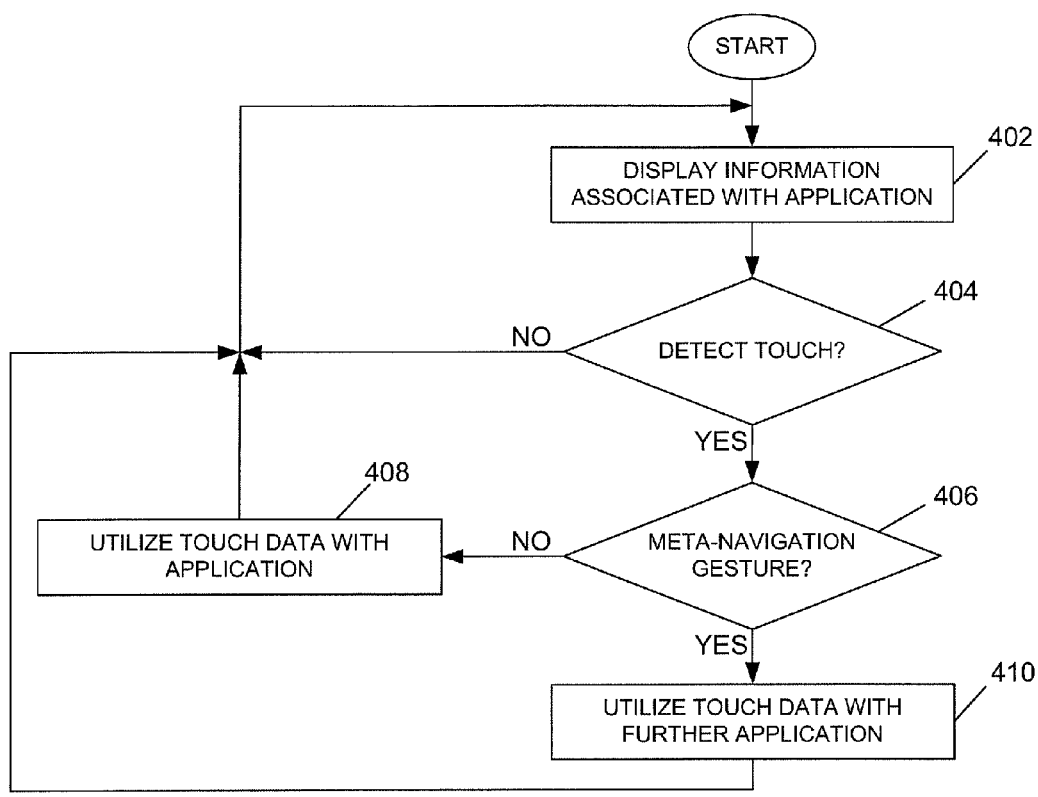
FIG. 4 is a flowchart illustrating a method of controlling the portable electronic device in accordance with the disclosure.

A flowchart illustrating a method of controlling an electronic device, such as the portable electronic device 100, is shown in FIG. 4. The method may be carried out by computer-readable code executed, for example, by the processor 102. Coding of software for carrying out such a method is within the scope of a person of ordinary skill in the art given the present description. The method may contain additional or fewer processes than shown and/or described, and may be performed in a different order.

The process may be carried out in any suitable application, such as, a home screen application, an email application, a text messaging application, a calendar application, a tasks application, an address book application, a web browser application, or any other suitable application. Information from the application, referred to as the first application, is displayed on the touch-sensitive display 118 of the portable electronic device 100 at 402. When a touch is detected at 404, the process continues at 406 and a determination is made whether or not the touch is a meta-navigation gesture. The determination is made based on the attributes of the touch as described above. In response to determining that the touch is not a meta-navigation gesture, which may be a tap on the touch-sensitive display 118 or may be a non-meta navigation gesture, the touch data is utilized in association with the first application for which information is displayed on the touch-sensitive display 118 at the time the gesture is received, at 408. In response to identifying the touch as a meta-navigation gesture at 406, the touch data is utilized in a second application and information associated with the second, or with a further application, is displayed on the touch-sensitive display 118 at 410. The information associated with the second application may be overlaid on the information associated with the first application, for example, to facilitate navigation back to the information associated with the first application. Alternatively, the information associated with the second application may include, for example, information from a system level navigation interface, a configuration interface, a notification interface, a status interface, a menu interface, or information associated with any other interface.

Figure 5:
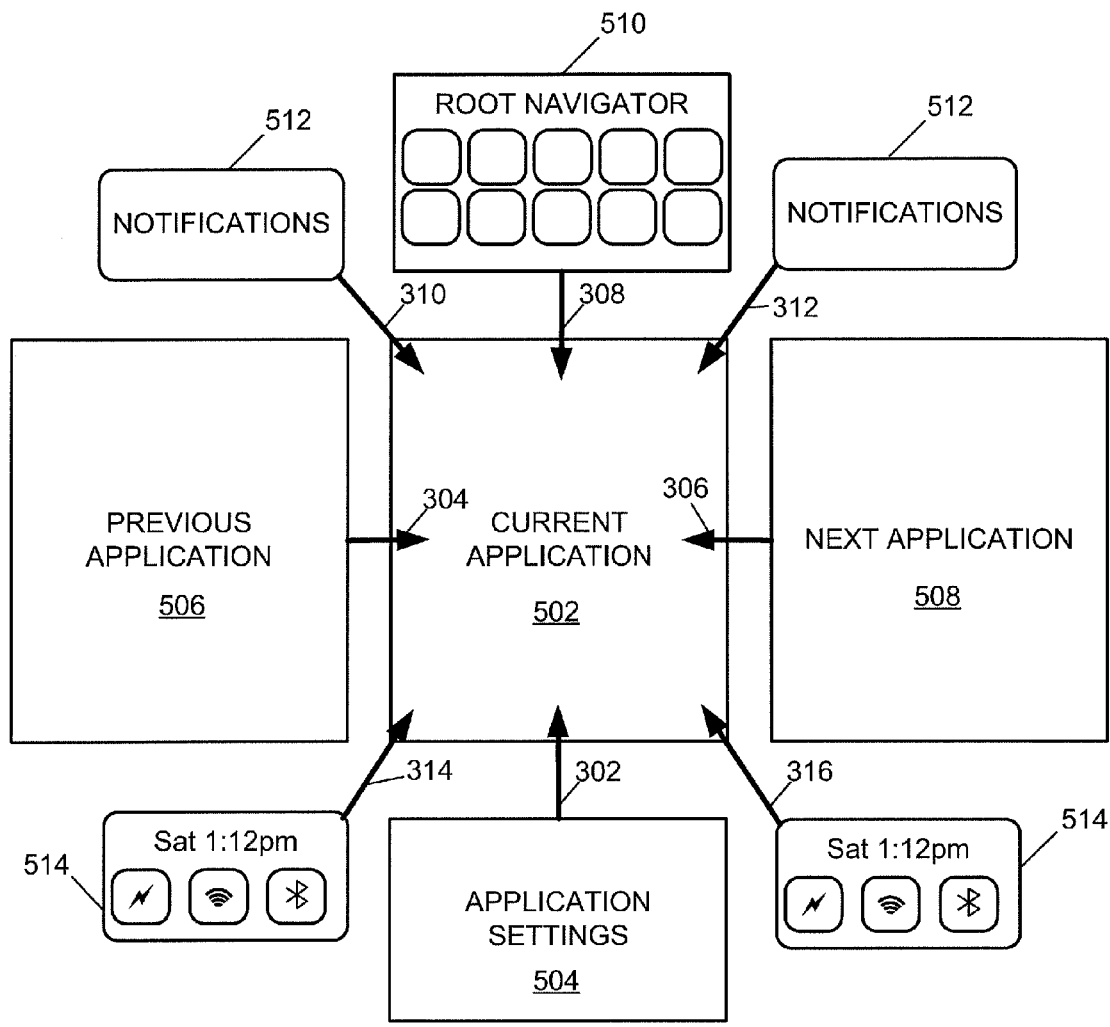
FIG. 5 illustrates examples of associations between meta-navigation gestures and information from various applications or application functions.

Referring again to FIG. 3, the touches 302, 304, 306, 308, 310, 312, 314, 316 identified as meta-navigation gestures may each be associated with information from an application such that attributes of the meta-navigation gesture such as the origin point, may be utilized to determine which application the meta-navigation gesture is associated with. FIG. 5 illustrates examples of associations between meta-navigation gestures and information from applications, other than the application associated with the information displayed on the touch-sensitive display 118 at the time the gesture is received. The relationships shown in FIG. 5 are shown for illustrative purposes only and are interchangeable. Further applications and alternative associations may be utilized.

The meta-navigation gesture 302, which originates in the present example near a bottom, center of the touch-sensitive display 118 and follows a generally vertical path in the orientation in which the information from a current application 502 is displayed, causes a homescreen associated with a root-navigation application 510 to replace the information associated with the current application 502. The homescreen includes a carousel showing the currently active applications indicated in a top portion of the display. Accordingly, currently active applications are shown in a browsable carousel in the top portion of the Home Screen. The carousel is located at a top portion of the homescreen. In the present example, the top portion utilizes only about ⅓ of the homescreen, and application icons for non-active applications are provided at the bottom portion of the homescreen for ease of selection.

The meta-navigation gesture 304, which originates near a left, center of the touch-sensitive display 118 and follows a generally lateral path, causes the information associated with the current application 502 to be replaced with information associated with a previous application 506, which may be a previous application in a grouping or may be an application associated with information previously displayed. The meta-navigation gesture 306, which originates near a right, center of the touch-sensitive display 118 and follows a generally lateral path, causes the information associated with the current application 502 to be replaced with information associated with a next application 508, which may be a next application in a grouping.

The lateral gesture, in the present examples, originates from either the left side or the right side of the touch-sensitive display 118, and may cause the information associated with the current application 502 to be reduced in size to provide a visual cue of other active applications prior to replacing the information with the previous application 506 or the next application 508. For example, a portion of the information of the previous application 506 may be displayed in a thin sliver adjacent the edge or edges of the display area 206 during the gesture and prior to replacement of the information associated with the current application 502. The information associated with the current application 502 may be replaced with the previous or next application 508 as the gesture continues. In an alternative example, a portion of the information of the previous application 506 or a portion of the information for the next application 508 may be displayed in a thin sliver adjacent the edges of the display area 206 in response to a receipt of a first lateral gesture. In this example, a swipe within the thin sliver may cause scrolling of the next and last applications in a list. A second lateral meta-navigation gesture such as the gestures 304, 306 may be utilized to cause the information associated with the current application 502, which information is reduced in size, to be replaced.

The meta-navigation gesture 308, which originates near a top, center of the touch-sensitive display 118 and follows a generally vertical path, causes the information associated with the current application 502 to be replaced with information associated with an applications settings application 504.

The meta-navigation gesture 310, which originates near a top, left corner of the touch-sensitive display 118, causes information associated with a notification application 512 to be tiled over the information associated with the current application 502. Similarly, the meta-navigation gesture 312, which originates in the present example near a top, right corner of the touch-sensitive display 118, causes information associated with the notification application 512 to be tiled over the information associated with the current application 502.

The meta-navigation gesture 314, which in the present example originates near a bottom, left corner of the touch-sensitive display 118, causes information associated with a status application 514 to be tiled over the information associated with the current application 502. Similarly, in the present example the meta-navigation gesture 316, which originates near a bottom, right corner of the touch-sensitive display 118, causes information associated with the status application 514 to be tiled over the information associated with the current application 502.

ATtention (AT) commands may be utilized to control Mobile Termination (MT) functions and network services from a Terminal Equipment (TE) through Terminal Adaptor (TA). AT is the two-character abbreviation that is utilized to start a command line that is sent from TE to the TA. For example, the Touch screen action Control command (+CTSA) may be utilized to operate a touch-sensitive display of a MT. The x, y coordinates of the portable electronic device 100 may be fixed even when the portable electronic device 100 is turned sideways or changes from landscape to portrait orientation or from portrait to landscape orientation, or the orientation changes otherwise (for example via emulation). A meta-navigation gesture on the touch-sensitive display 118 may be emulated. In the following example AT commands are sent to the MT to emulate a user touching the touch-sensitive display 118. The touch-sensitive display 118 is touched at location (10,10), the touch location is moved (50,50), and then moved to (100,100). The touch is removed from the touch-sensitive display 118 or discontinued at location (100, 100).

AT+CTSA=1,10,10
AT+CTSA=1,50,50
+CTSA=0,100,100

Additionally, meta-navigation gesture on the touch-sensitive display 118 may be reported by providing unsolicited events or by providing unsolicited codes. When receiving the events or the codes, a meta-navigation gesture may be determined.

The above examples relate to operating through the TE. When the MT is operated through a keypad of the MT, or utilizing the touch-sensitive display 118 of the MT, or when there are changes in the status of a display elements, information about these actions is provided to the TE. The information may be provided via unsolicited result codes or unsolicited AT command responses which return keypad, display text and indicator, and touch-sensitive display events. For example the AT command +CKEV (see 3GPP TS 27.007 [http://www.3gpp.org/ftp/Specs/archive/27_series/27.007/27007-a40.zip]) returns the key code and an indication when the key is pressed (1) or released (0), and the AT command +CTEV returns the location of the action performed on the touch-sensitive display 118. In the following example, the key associated with the number 1 is pressed, the display is updated, and the key is released:

+CKEV: 49,1
+CDEV: 1,"1"
+CKEV: 49,0

As described above, a corner of the non-display 208 area may be identified as being the upper-left corner. An AT command, Command Screen Orientation (CSO) may be utilized to set or read back the orientation of the touch-sensitive display 118. Table 1 illustrates CSO commands and example responses to the CSO commands. The following syntactical definitions apply:

<CR> Carriage return character, which value is specified with command S3.

<LF> Linefeed character, which value is specified with command S4.

< . . . > Name enclosed in angle brackets is a syntactical element. Brackets do not appear in the command line.

[ . . . ] Optional subparameter of a command or an optional part of TA information response is enclosed in square brackets. Brackets do not appear in the command line. When subparameter is not given in parameter type commands, the new value equals the previous value.

TABLE 1

+CSO parameter command syntax

| Command | Example response(s) |
|---|---|
| +CSO=[<orientation>,[<Top_Left_X>,<Top_Left_Y]] | + ERROR: <err> |
| +CSO? | +CSO: <orientation>,<Top_Left_X>,<Top_Left_Y > |
|  | + ERROR: <err> |
| +CSO=? | +CSO:(list of supported <orientations>) |
|  | + ERROR: <err> |

The top Left X may be a positive integer representing the x coordinate of the top left pixel, and the Top Left Y may be a positive integer representing the y coordinate of the top left pixel. The CSO commands may be utilized to set the reference orientation and may be utilized for testing purposes.

As an alternative, also described above, the orientation may be expressed in one or more scalars, each for example representing an angle relative to a coordinate or a corner, for example the upper-left corner. Again, an AT command, for example Command Screen Orientation (CSO), may be utilized to set or read back the orientation of the touch-sensitive display 118. Table 2 illustrates CSO commands and example responses to the CSO commands.

TABLE 2

+CSO parameter command syntax

| Command | Example response(s) |
|---|---|
| +CSO=[<orientation>,[< degrees_orientation >[,< degrees_tilted]]] | + ERROR: <err> |
| +CSO? | +CSO: <orientation>,[< degrees_orientation>[,< degrees_tilted >]] |
|  | + ERROR: <err> |
| +CSO=? | +CSO:(list of supported <orientations>) |
|  | + ERROR: <err> |

The degrees orientation and the degrees_tilted may be a positive integer representing the angle with the origin coordinates and coordinate axes. The degrees_orientation and the degrees_tilted may utilize a fixed number of values such that the angle of degrees_orientation and/or the degrees_tilted are in fixed increments relative to 0 degrees. For example, increments of 90 degrees may be utilized. Other increments may be utilized depending on device. The CSO commands may be utilized to set the reference orientation and may be utilized for testing purposes. A device need not be able to provide or accept a degrees_tilted value, as expressed with the square brackets notation.

As described above, the orientation may be expressed in 4 values, for example "top", "bottom", "left side", "right side". Again, an AT command, for example named Command Screen Orientation (CSO), may be utilized to set or read back the orientation of the display 112 and the touch-sensitive overlay 114.

Meta-navigation gestures may be detected, for example, by determining the coordinate size of the touch-sensitive overlay 114 and the size and coordinate location of the display area 206. An AT command, for example named Command Screen Size (CSS), may be utilized to determine the coordinate size of the touch-sensitive overlay 114, or the total size of the display area 206 and the non-display area 208. The AT command CSS may give the maximum x coordinate value and the maximum y coordinate value.

The size and coordinate location of the display area 206 may be obtained. An AT command, for example, Display Screen Boundary (DSB), may be utilized to obtain the top left x coordinate, the top left y coordinate, the bottom right x coordinate and the bottom right y coordinate. This command facilitates identification of the boundary between the display area 206 and the non-display area 208. The top left x coordinate may be a positive integer representing the x coordinate of the top left pixel and the top left y coordinate may be a positive integer representing the y coordinate of the top left pixel of the display area 206. The bottom right x coordinate may be a positive integer representing the x coordinate of the bottom right pixel and the bottom right y coordinate may be a positive integer representing the y coordinate of the bottom right pixel of the display area 206. For an electronic device for which the touch-sensitive overlay does not extend over the non-display area 208, the DSB coordinate values match the CSS values. The CSS and DSB commands may be utilized to detect the boundary between the display area 206 and the non-display area 208 and may be utilized for testing purposes. For example, the CSS and DSB commands may be utilized to emulate a gesture that crosses the boundary. The boundary crossed may be 1 pixel wide. In some embodiments, this boundary size may be of different width or size. For example, in some embodiments, the width of the boundary at the top is different than the width of the boundary at the bottom. Also the boundary may, optionally, be part of the display area 206 of the touch-sensitive display 118.

The UE may therefore be tested by providing commands to the UE to emulate a meta-navigation gesture. If the commands are AT commands, AT commands like CSS, DSB, and CSO may be received by the device. One or more commands may constitute a meta-navigation gesture.

Figure 6:
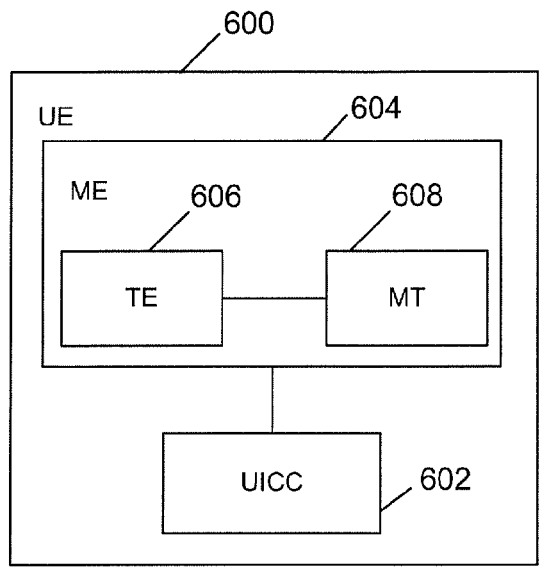
FIG. 6 illustrates an example of functional components of a user equipment, such as the portable electronic device of FIG. 1.

FIG. 6 illustrates an example of functional components of a user equipment (UE), such as the portable electronic device 100 of FIG. 1. The UE 600 may include the UICC to contain personal data. If present, the UICC is coupled to the Mobile Equipment (ME) 604. The ME 604 includes the TE 606 and the MT 608, between which the AT commands are passed, or communicated. An ME or AT is an example of an AT command sink and a TE is an example of an AT command source.

Figure 7:
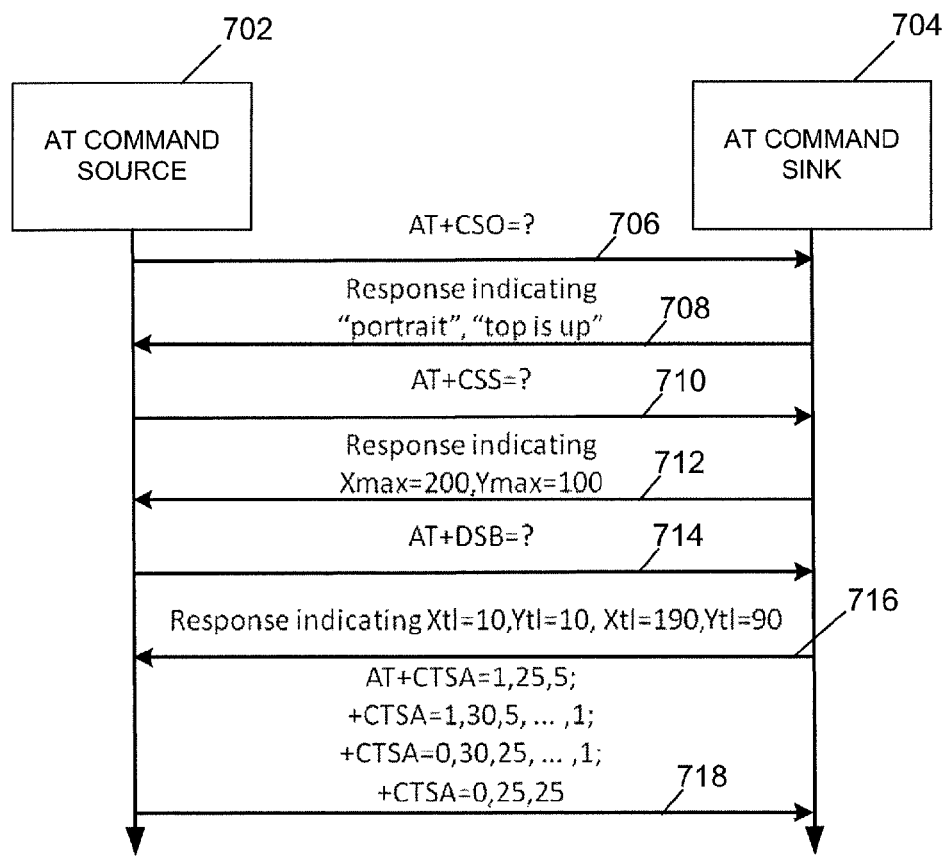
FIG. 7 is a sequence diagram illustrating an example of use of AT commands to emulate gestures relative to an orientation.

FIG. 7 shows a sequence diagram illustrating an example of use of AT commands to emulate meta-navigation gestures relative to an orientation. FIG. 7 includes an AT command sink 702 and an AT command source 704. A TA is an example of a sink such as the sink 702. A TA may adapt the AT commands and AT command responses prior to involving a MT. A TE is an example of a source, such as the source 704. A source sends AT commands and the TE may receive AT command responses. The source determines the orientation at 706 utilizing, for example, an AT+CSO command and the response 708 is received. The response 708 may indicate, for example, that the touch-sensitive display 118 is in "normal" orientation. The source determines the size of the touch-sensitive display 118 at 710 by sending, for example, an AT +CSS command and receives the response 712. The response 712 may indicate, for example, a size of Xmax=200, Ymax=100. The source determines the presence of the display area 206 of the touch-sensitive display 118 and the size of the display area 206 at 714 by sending, for example, an AT+DSB command. The source receives the response at 716, which may indicate, for example, Xt1=10, Yt1=10, Xt1=190, YTL=90. In some example embodiments, the coordinates of the boundary on the touch-sensitive display 118 of the ME is determined. For example, when an integer value is known or received, the integer value represents the size or width of the boundary, and the value is positive, the boundary may be part of the display area 206 of the touch-sensitive display 118. When the integer value is negative, the boundary may be part of the non-display area 208 of the touch-sensitive display 118. The source generates or emulates a meta-navigation gesture relative to the orientation at 718, by providing origin point coordinates of the gesture within the non-display area 208 of the touch-sensitive display 118 and by providing end point coordinates within the display area 206 of the touch-sensitive display 118. In the example illustrated, the emulated meta-navigation gesture is a multi-touch gesture including multiple simultaneous touches. The touches are, for example, vertical swipes in a direction away and perpendicular relative to the side that is at the top. FIG. 7 illustrates examples of interactions and AT commands or responses. Unsolicited messages may also be passed between AT command source and AT command sink (for example +CMER: 1,25,5; +CMER: 1,30, 5, . . . , 1; +CMER: 0,30,25, . . . ,1; +CMER: 0,25,25) informing a recipient that the gestures representing the meta-navigation gesture has occurred.

The portable electronic device 100 illustrated in the example of FIG. 2 includes a non-display area 208 and boundary 210 that extends or wraps around the display area 206. The emulation or indication of gestures is not limited to the non-display area 208 that extends entirely around a display area 206. For example, emulation of gestures may be carried out for an electronic device that includes a display area 206 that is adjacent to a non-display area 208 or has a non-display area 206 that is adjacent to fewer than four sides.

Further, the disclosure is not limited to emulation or indicating gestures using a single, common coordinate system for an adjacent display area 206 and non-display area 208 of a single display. For example, a UE may include multiple, non-adjacent display areas or non-display areas. According to another example, the UE may include multiple display areas and/or non-display areas, and some of these areas may not share a single origin point. According to yet a further example, multiple display areas and/or non-display areas may include multiple coordinate systems that may overlay each other.

In the examples described above, an additional indication or identifier of the display area or non-display area of the touch-sensitive display, or the coordinate system on which a press down or touch is emulated, is beneficial when an AT command is utilized to emulate a touch is detected on the touch-sensitive display 118, for example, at coordinates (25, 45). Similarly, when a touch event is reported, for example, using unsolicited result code +CTEV: 1,25,45, an indication of which display area 206 or non-display area 208, or within which coordinate system the touch event has occurred is beneficial. The display area 206 and the non-display area 208 are each referred to herein as a screen.

When multiple interaction areas, or touch-sensitive areas exist, these areas may have properties, such as the property of being a non-display area 208 or a display area 206. Information for the interaction areas may be utilized when emulating or to understand a reported touch event. Properties may be provided for each area prior to interacting with an area. Interacting includes receiving AT commands emulating gestures or reporting events. For example, a command may be supported by a MT or TA such that a list including identifiers identifying areas for interaction is provided in response to the command. An AT command may be supported by a MT or TA listing properties associated with an interaction area. Such a command may utilize an identifier identifying an interaction area as parameter. A list of properties associated with the interaction area may be provided in response to the AT command. Examples of such properties include an indication whether the area is a display area 206 or non-display area 208, an indication whether the area is adjacent to another interaction area, an indication whether the interaction area is or is not on the UE. If the interaction area is not on the same UE, the area may be communicatively connected, or coupled, to the UE. The indication of whether an interaction area is not on the UE may indentify the area via communication protocol name, communication protocol port or communication address, e.g. "USB", "USB1", "HDMI", "HDMI5", "BLUETOOTH", "SIP:interactive-tv-screen@home.nl".

Other examples of properties of the interaction areas include the area resolution or size (for example, in pixels).

As indicated above, one example of a property is an indication whether the interaction area is adjacent to another interaction area. A boundary exists where an interaction area is adjacent with another interaction area. A meta-navigation gesture may be provided, identified or detected when the meta-navigation gesture crosses the boundary, for example, the gesture originates on one interaction area and ends on another interaction area. A meta-navigation gesture may be emulated by a first emulation command indicating initiation of a touch event, which touch event may be identified by an identifier, on or associated with a first interaction area. Subsequently, a second emulation command, indicating release at a second interaction area or indicating termination of the touch event, is provided. When the touch event is identified by a identifier, the identifier may be the same identifier utilized to identify the first touch event. Typically, emulation of a meta-navigation gesture includes multiple commands, for example the first emulation command and the second emulation command. Such emulation commands can be AT commands.

A meta-navigation gesture may also be identified, detected, emulated, or reported if the meta-navigation gesture occurs on non-adjacent interaction area. Reported touch events and touch commands for such meta-navigation gestures include at least one parameter identifying the interaction area. Prior to reporting, emulation, or receiving touch commands, a list with identifiers that identify the interaction areas is provided. In one implementation, properties for each interaction area may be provided responsive to receiving an AT command.

Other commands and reported events may also indicate the interaction area that the command or event pertains to. For example, when displaying one or more characters, the command initiating the displaying may indicate the interaction area. Similarly, when reporting the printing of a character, the reporting event may indicate the interaction area. With the proliferation of keyboards on a UE, an interaction area may also be provided in commands or reporting events, for example, when the keyboard is a virtual keyboard.

Commands may be utilized to configure a filter such that not all unsolicited result codes are received by a TE. For example a command may enable or disable sending of unsolicited result codes from TA or MT in the case of key presses or touches, display changes, touch events, and indicator state changes, such as a battery indicator or a radio strength indicator. An example of an AT command enabling of disabling sending is Mobile Termination event reporting: +CMER.

Enabling or disabling sending of unsolicited result codes or sending of unsolicited events depending on the interaction area may be advantageous. When a command is received to enable sending of unsolicited result codes or enable sending of unsolicited events depending on the interaction area, the command may include at least one identifier identifying the interaction area. When a command is received to disable sending of unsolicited result codes or disable sending of unsolicited events depending on the interaction area, the command may include at least one identifier identifying the interaction area. Before receiving unsolicited result codes or before receiving unsolicited events, depending on the interaction area, a command enabling sending of unsolicited result codes or enabling sending of unsolicited events depending may be provided. Additionally, before sending unsolicited result codes or before sending unsolicited events, depending on the interaction area, a command enabling sending of unsolicited result codes or enabling sending of unsolicited events may be received. The present disclosure is not limited to identifying meta-navigation gestures utilizing a touch-sensitive overlay 114 that extends over the non-display area 208. Meta-navigation gestures may be detected based on, for example, the first detected touch location at a margin of the touch-sensitive overlay 114, which may be at a margin of the displayable area, and, optionally, based on the gesture speed or direction when the touch is detected or path traversed by the gesture. Identification of meta-navigation gestures may also be carried out utilizing a heuristic algorithm based on touch attributes and responsive to touch attributes such as one or more of the origin point, speed, direction, distance and path of the gesture.

Optionally, the electronic device may include a touch-sensitive frame of the housing or a touch-sensitive bezel circumscribing the touch-sensitive overlay 114. Meta-navigation gestures may be identified based on an origin point detected on the touch-sensitive frame or bezel.

Further, the boundary that is crossed by a meta-navigation gesture is not limited to the boundary between the display area 206 and the non-display area 208 of the touch-sensitive display 118. Other suitable boundaries may be utilized and may include a region or band along a margin of the touch-sensitive overlay 114, a predetermined line, or lines on the touch-sensitive display 118, or the boundary where the bezel or frame of the electronic device meets the touch-sensitive display 118.

Identification of meta-navigation gestures is not limited to electronic devices with touch-sensitive displays that include a touch-sensitive overlay 114 that covers the non-display area 208 of the display. Identification of meta-navigation gestures may be carried out utilizing other electronic devices. Further, the electronic device described with reference to the figures is provided as an example of an electronic device. Other electronic devices may be utilized and many of the features of the electronic device described with particular reference to FIG. 1, are optional. For example, the communication subsystem 104 is optional. Further, the short-range communications and the SIM/USIM/RUIM 138 are also optional. Further, the electronic device may include additional features not referred to or described herein.

The use of meta-navigation gestures and the identification of such gestures provide additional input that may be distinguished from non-meta-navigation gestures or other touches. These meta-navigation gestures facilitate entry of input related to an application for which information is not displayed at the time the gesture is received. Thus, input may be received relating to an application that is not associated with information displayed on the touch-sensitive display 118 without the use of icons or selectable features displayed on the touch-sensitive display and without the need to use other controls on the electronic device such as physical buttons or switches. An area or areas of the touch-sensitive display 118 are not taken up to display such icons or selectable features. System level navigation is therefore provided without the use of additional display of information or menus for such navigation, providing an improved interface.

According to one aspect, a method for a User Equipment (UE), includes responsive, at least in part, to an ATtention (AT) command for touch-sensitive input device action, emulating a meta-navigation gesture for a touch-sensitive input device including a display area and anon-display area.

According to another aspect, a method for a device includes issuing an AT command to emulate a meta-navigation gesture.

According to another aspect, a method of testing a UE includes receiving one or more AT commands to emulate a meta-navigation gesture and providing information in response to at least one of the one or more AT commands.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method for a User Equipment (UE), the method comprising:
responsive, at least in part, to an ATtention (AT) command for touch-sensitive input device action, emulating a meta-navigation gesture for a touch-sensitive input device including a display area and a non-display area; and
responsive, at least in part, to an ATtention (AT) command for orientation information, providing orientation information comprising at least one of: unsolicited result codes, unsolicited ATtention (AT) commands, or unsolicited events.

2. The method according to claim 1, comprising responsive, at least in part, to an AT command for non-display boundary information, providing non-display boundary information.

3. The method according to claim 1, comprising responsive, at least in part, to an AT command for command screen size, providing command screen size information.

4. The method according to claim 1, wherein the orientation information comprises an identification of at least one feature of the touch-sensitive input device as a reference.

5. The method according to claim 4, wherein the orientation information comprises an identification of at least one corner of the touch-sensitive input device.

6. The method according to claim 5, wherein the orientation information comprises coordinate values of the at least one corner.

7. The method according to claim 4, wherein the orientation information comprises an identification of at least one side of the touch-sensitive input device.

8. The method according to claim 1, wherein the orientation information comprises a scalar representing an angle of rotation of the UE to a reference orientation.

9. The method according to claim 8, wherein the orientation information comprises a scalar representing an angle of tilt.

10. The method according to claim 8, wherein the at least one scalar comprises one of a fixed number of values representing the angle of rotation.

11. The method according to claim 3, wherein the command screen size information comprises a maximum x coordinate value and a maximum y coordinate value.

12. The method according to claim 2, wherein the non-display boundary comprises a boundary between the non-display area and the display area.

13. The method according to claim 12, wherein the non-display boundary information comprises coordinate values of the boundary.

14. The method according to claim 13, wherein the coordinate values comprise coordinate values of opposing corners of the boundary.

15. The method according to claim 1, wherein the meta-navigation gesture comprises a multi-touch gesture.

16. The method according to claim 15, wherein the touches of the multi-touch gesture are identified by a same identifier.

17. The method according to claim 1, comprising, responsive, at least in part, to an ATtention (AT) command for at least one of the display area and the non-display area, providing an indication of a property of the at least one of the display area and the non-display area.

18. A non-transitory computer-readable medium having computer-readable code executable by at least one processor of the UE to:
responsive, at least in part, to an ATtention (AT) command for touch-sensitive input device action, emulate a meta-navigation gesture for a touch-sensitive input device including a display area and a non-display area; and
responsive, at least in part, to an ATtention (AT) command for orientation information, provide orientation information comprising at least one of: unsolicited result codes, unsolicited ATtention (AT) commands, or unsolicited events.

19. A User Equipment (UE) comprising:
a touch-sensitive display;
memory;
a processor coupled to the touch-sensitive display and the memory and configured to:
responsive, at least in part, to an ATtention (AT) command for touch-sensitive input device action, emulate a meta-navigation gesture for a touch-sensitive input device including a display area and a non-display area; and
responsive, at least in part, to an ATtention (AT) command for orientation information, provide orientation information comprising at least one of unsolicited result codes, unsolicited ATtention (AT) commands, or unsolicited events.

20. A method for a device, the method comprising:
issuing an ATtention (AT) command to emulate a meta-navigation gesture for a touch-sensitive input device including a display area and a non-display area; and
issuing an ATtention (AT) command to provide orientation information comprising at least one of unsolicited result codes, unsolicited ATtention (AT) commands, or unsolicited events.

21. The method according to claim 20, comprising issuing an AT command for non-display boundary information and receiving the non-display boundary information from the UE.

22. The method according to claim 20, comprising issuing an AT command for command screen size and receiving command screen size information from the UE.

23. A non-transitory computer-readable medium having computer-readable code executable by at least one processor of a device to:
issue an ATtention (AT) command to emulate a meta-navigation gesture for a touch-sensitive input device including a display area and a non-display area; and
issue an ATtention (AT) command to provide orientation information comprising at least one of unsolicited result codes, unsolicited ATtention (AT) commands, or unsolicited events.

* * * * *